United States Patent [19]
Toerner

[11] Patent Number: 5,353,647
[45] Date of Patent: Oct. 11, 1994

[54] APPARATUS FOR MEASURING CORIOLIS FORCES FOR ASCERTAINING A MASS FLOW, ESPECIALLY A BULK MATERIAL FLOW

[75] Inventor: Ludger Toerner, Eppertshausen, Fed. Rep. of Germany

[73] Assignee: Carl Schenck AG, Darmstadt, Fed. Rep. of Germany

[21] Appl. No.: 93,205

[22] Filed: Jul. 16, 1993

[30] Foreign Application Priority Data

Sep. 30, 1992 [EP] European Pat. Off. ............ 92116705

[51] Int. Cl.⁵ .................................................. G01F 1/82
[52] U.S. Cl. ...................... 73/801.37; 73/861.36
[58] Field of Search ............ 73/861.36, 861.37, 861.38

[56] References Cited

U.S. PATENT DOCUMENTS

| | | | |
|---|---|---|---|
| 4,700,578 | 10/1987 | Fassbinder | 73/861.37 |
| 4,805,462 | 2/1989 | Labschies | 73/861.36 |
| 5,088,331 | 2/1992 | Fassbinder | 73/861.37 |

FOREIGN PATENT DOCUMENTS

| | | | |
|---|---|---|---|
| 0196440 | 10/1986 | European Pat. Off. | |
| 3346145 | 7/1985 | Fed. Rep. of Germany | |
| 62-112023 | 5/1987 | Japan | |
| 0657257 | 4/1979 | U.S.S.R. | 73/861.36 |
| 2127549 | 4/1984 | United Kingdom | |

Primary Examiner—Richard E. Chilcot, Jr.
Assistant Examiner—Harshad Patel
Attorney, Agent, or Firm—W. G. Fasse; W. F. Fasse

[57] ABSTRACT

A mass through-flow is continuously measured by measuring the Coriolis forces that are caused by the mass flow passing through a winged wheel. The mass flow is introduced centrally onto the winged wheel which rotates with a constant r.p.m. and diverts the mass flow radially outwardly. The Coriolis forces and thus the corresponding reaction torques which are proportional to the mass through-flow are measured with the aid of a torque joint interposed between a housing of the winged wheel and a drive motor for the shaft that drives the wheel. Force sensor elements, preferably in the form of bending beams, are incorporated into the torque joint and are deflected by the reaction torque moment applied to the motor housing. These bending beams provide an output signal that is proportional to the mass through-flow through the apparatus.

10 Claims, 2 Drawing Sheets

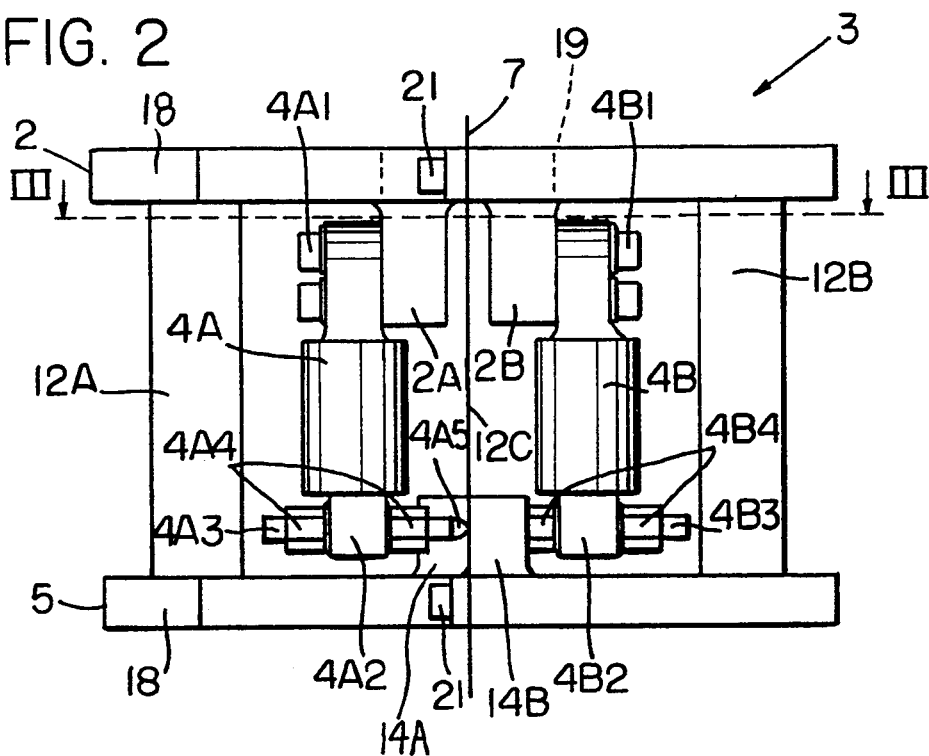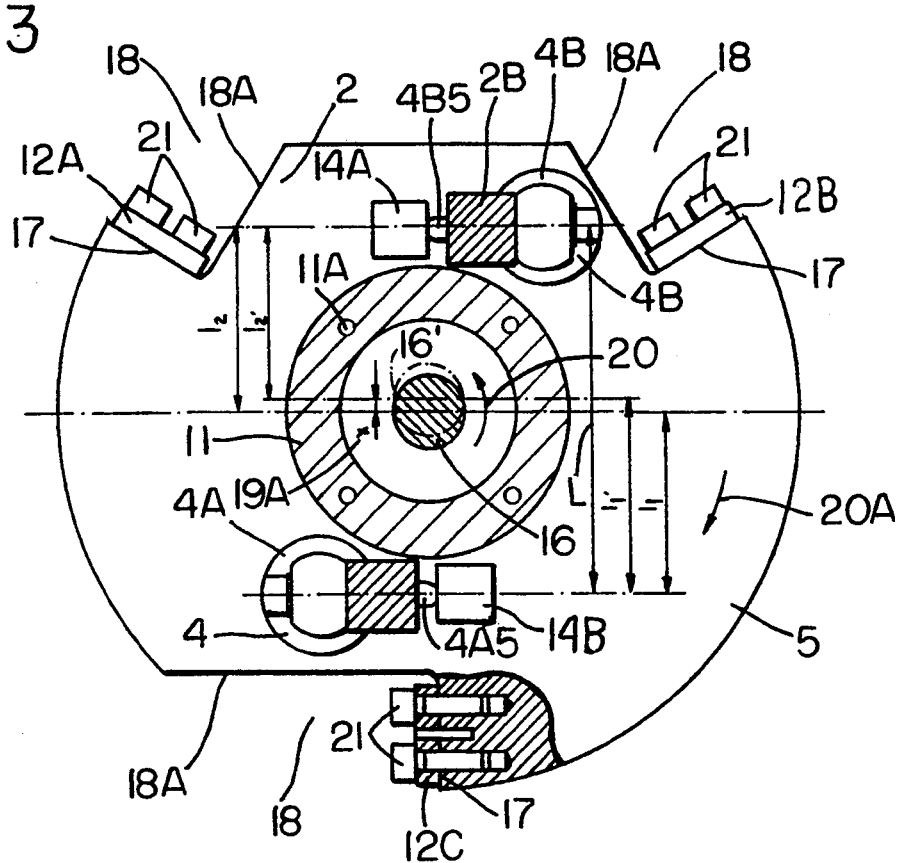

APPARATUS FOR MEASURING CORIOLIS FORCES FOR ASCERTAINING A MASS FLOW, ESPECIALLY A BULK MATERIAL FLOW

FIELD OF THE INVENTION

The invention relates to a Coriolis type mass flow meter in which the mass flow, such as a flow of granular material, is introduced into the apparatus centrally relative to a rotational axis and accelerated radially outwardly, whereby the drive torque is measured, or rather the corresponding reaction torque is measured.

BACKGROUND INFORMATION

Coriolis type mass flow meters are known in the art. In order to measure the weight of a material flow precisely, the effective Coriolis force or inertia force is measured. Such a force occurs when a moving mass particle is temporarily coupled with a rotating reference body. The resulting force is utilized for the mass determination. For this purpose, the material flow is directed onto a disk that is equipped with radially extending guide wings. The rotating disk with its guide wings makes sure that the flowable bulk material is diverted substantially radially, that is, perpendicularly to the rotational axis of the guide disk, whereby the bulk material is flung radially outwardly. The torque moment applied to the disk which rotates at a constant r.p.m. varies in accordance with the Coriolis force, whereby the torque variations are proportional to the respective mass flow.

An apparatus of the above type for the continuous weight measurement of a bulk material flow is described in German Patent Publication (DE-OS) 3,346,145 (Friedrich), published on Jul. 18, 1985.

In the known apparatus the winged disk or wheel is driven with a constant r.p.m. by an electric motor arranged axially directly above the winged wheel. The motor itself is mounted in a stationary housing in the manner of a pendulum. For this purpose a lever arm is secured to the drive motor which is pivotably mounted. The motor bears through the lever arm onto a force sensor such as a load cell secured to the housing, whereby the reaction torque moment of the occurring motor housing rotation is transmitted to the force sensor or load cell. The sensed force is multiplied by the length of the Lever arm to obtain the desired torque moment which corresponds precisely to the mass throughflow or throughput of the bulk material through the rotating disk. In the known apparatus the motor that is suspended in the manner of a pendulum, is guided by ballbearings relative to the stationary housing. Even though the friction in these ballbearings is small, such friction may still falsify the measurement of the torque moment. Even if the bearing friction is initially measured while no bulk material is running through the apparatus, and the respective "empty" measurement is taken into account subsequently, the measurement is not very precise because different frictions occur when the apparatus runs empty and when it runs while material is flowing through the apparatus. These bearing frictions can differ due to several factors. Such factors may include the one-sided mounting of the motor relative to the bearing walls, and a nonuniform lubrication, as well as a nonuniform distribution of the mass flow over the surface of the distribution disk, whereby the measuring results may be falsified.

OBJECTS OF THE INVENTION

In view of the foregoing it is the aim of the invention to achieve the following objects singly or in combination:

to improve a torque measuring device for measuring the Coriolis force in such a manner that simple features increase the measuring precision, thereby eliminating or at least reducing adverse influences, such as frictional influences.

to avoid the use of bearing mountings for the drive motor by using motor mounting springs;

to avoid influences on the measurement that may occur if an actual rotational axis of the drive motor should not coincide with the theoretical rotational axis of the system; and to use at least two sensors that are arranged symmetrically relative to the theoretical rotational axis for compensating irregularities that may be caused by radial displacements, however small, of the rotational motor shaft.

SUMMARY OF THE INVENTION

According to the invention the present torque moment measuring apparatus is characterized by a torsion joint arranged between the drive motor and at least two force sensors. The torsion joint has a stationary member and a force introducing member for introducing force to the at least two force sensors. Spring elements are arranged between the stationary member and the force introducing member. The spring elements are rigid against bending in the axial direction, but soft against bending in the rotational direction of the motor drive shaft. The at least two force sensing elements are also arranged between the stationary member and the force introduction member in a symmetrical distribution relative to the central rotational axis.

The arrangement according to the invention has the advantage that substantially no frictional forces can adversely influence the torque measurements. This advantage and others are achieved since the drive motor is not supported by bearings that are unavoidably influenced by friction forces. Rather, the motor is supported exclusively by spring elements. Since the spring elements are stiff against bending in the axial or vertical direction which is the motor suspending direction, and soft against bending in the rotational direction, it is assured that the drive torque moment is transmitted to the force sensing elements without frictional losses.

Still another advantage of the invention resides in the fact that radial displacements of the drive shaft of the motor relative to the theoretical or stationary rotational axis cannot have any influences on the measuring results, because the symmetrical arrangement of the force measuring or sensing elements provides a compensation for such motor shaft axis deviation from the central stationary axis. Such compensation is accomplished because the torque moment is calculated from the measured forces and the radial distance between the theoretical rotational axis and the force introduction point at the force measuring elements, whereby radial displacements of the rotational motor axis compensate each other due to the symmetric arrangement of the force measuring or sensing elements. More specifically, the compensation is achieved in that for example two load cells are arranged symmetrically relative to the theoretical axis in the same plane 180° opposite each other so that they have a fixed, constant spacing from each other, whereby the sum of the respective two lever arms also remains constant because any reduction of the length of one lever arm results simultaneously in a corresponding increase in the length of the opposite lever arm and vice versa.

BRIEF DESCRIPTION OF THE DRAWINGS

In order that the invention may be clearly understood, it will now be described, by way of example, with reference to the accompanying drawings, wherein:

FIG. 2 is a more detailed side view of a torsion joint including a rotatable member which carries a motor housing and acts as a force introduction member for introducing the force into force sensing elements or load cells, and a stationary member rigidly connected to an apparatus or wheel housing; and FIG. 3 is a sectional view along section plane III—III in FIG. 2.

Figure 1:
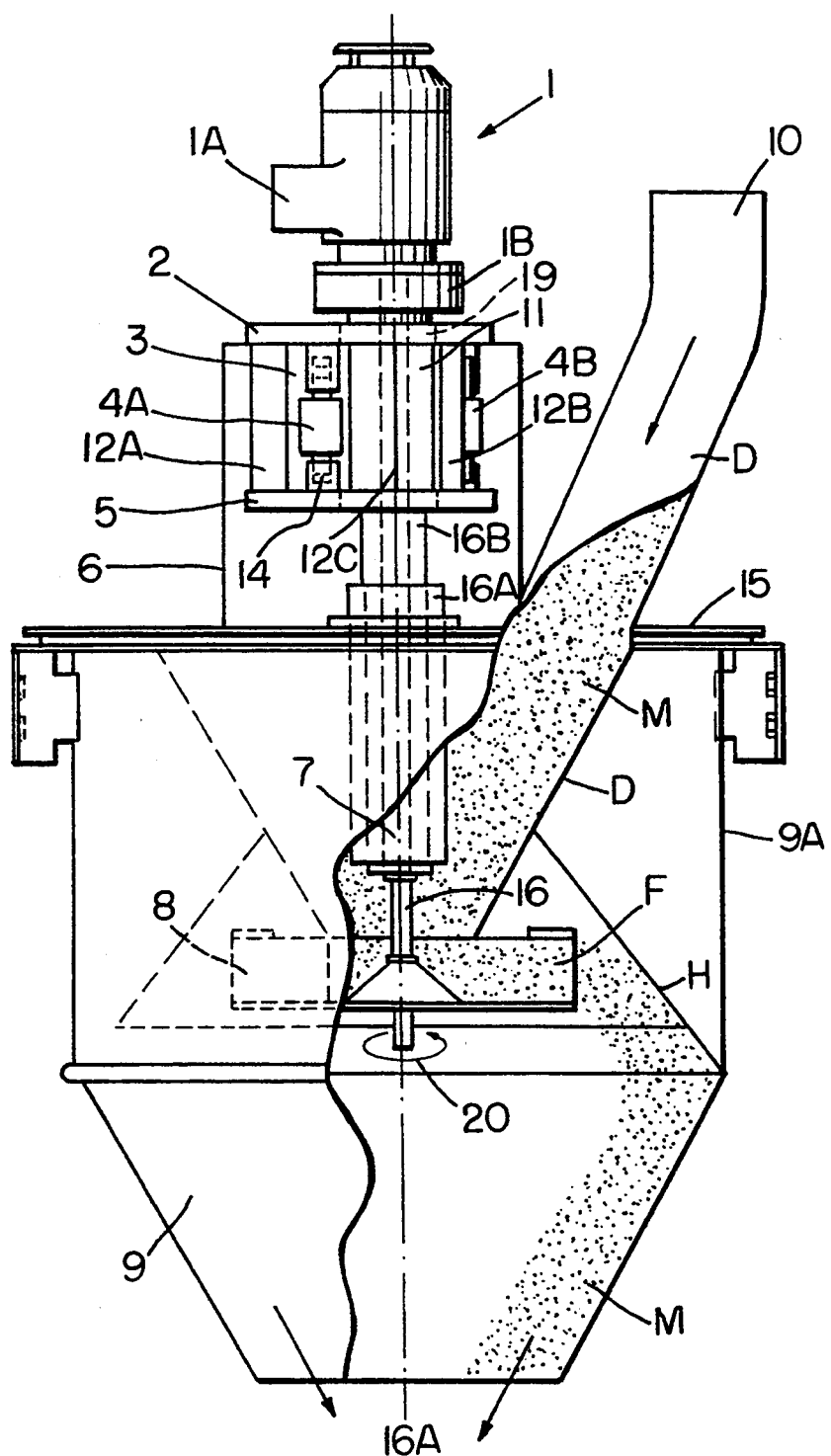
FIG. 1 shows an elevational side view of the apparatus according to the invention for measuring a mass flow of bulk material, such as granular material.

DETAILED DESCRIPTION OF PREFERRED EXAMPLE EMBODIMENTS AND OF THE BEST MODE OF THE INVENTION

FIG. 1 illustrates an apparatus for measuring Coriolis forces, thereby ascertaining the mass flow of a bulk material M, such as granular material fed into a hopper 10 leading into a duct D which in turn feeds the granular material M centrally into the apparatus so that the bulk material falls onto a winged wheel 8 which diverts the bulk material M into a radially outward flow F that is then diverted downwardly by a hood H into a feeder funnel 9 forming part of a wheel housing 9A. The winged wheel 8 is secured to a drive shaft 16 driven by a motor 1 to rotate as indicated by the arrow 20. Normally, the rotational axis 7 of the drive shaft 16 coincides with the stationary central vertical axis 16A of the apparatus. A torque joint 3 is constructed and arranged to measure the torque applied by the motor 1 to the winged wheel 8 as will be described in more detail below. The measured torque, or rather the torque moment or drive moment is proportional to the bulk material quantity being conveyed.

The housing 1A of the drive motor 1 is supported on a cover 15 of the wheel housing 9A as follows. The motor housing 1A of the motor 1 is connected through a flange 1B to a motor mounting tubular member 11 rigidly secured to a lower force introducing member 5 of a torque joint 3. The lower horizontally extending member 5 is connected to an upper rigid horizontally extending member 2 of the torsion joint 3 through a plurality of spring elements. For example, three such spring elements 12A, 12B, 12C operatively interconnect the bottom cross member 5 and the top cross-member 2 of the torque joint 3. The arrangement of the springs 12A, 12B, and 12C is seen also in FIGS. 2 and 3. The spring elements 12A, 12B and 12C according to the invention, are constructed as leaf springs which are stiff in the vertical direction in which they interconnect the upper and lower cross-members 2 and 5, and the springs are soft against bending in the rotational direction indicated by the arrow 20. Due to this construction of the springs 12A, 12B, and 12C it is possible that the lower cross-member 5 can rotate to a limited extent relative to the stationary top cross-member 2 which is rigidly connected to the cover 15 of the wheel housing 9A by a mounting sleeve 6. Thus, the upper cross-member 2 is stationary together with the housing 9A to which the cover 15 is also rigidly connected. However, the lower cross-member 5, to which the motor housing 1A is rigidly secured through the tubular member 11 and through the flange 1B, receives a reaction torque moment when the drive shaft 16 drives the winged wheel 8, whereby any torque applied to the motor housing is also applied to the lower cross-member 5 which applies a respective force to at least two load cells 4A, 4B for sensing the reaction torque moment as will be described in more detail below with reference to FIGS. 2 and 3.

FIG. 1 shows that the shaft 16 for driving the winged wheel 8 passes through a bushing 16A which in turn surrounds a protective pipe 16B. The bushing 16A is secured to the cover 15 of the housing 9A. The force transmitting lower member 5 is free to rotate relative to the protective pipe 16B to the extent permitted by the springs 12A, 12B, 12C when these springs are twisted.

FIGS. 1 and 2 show that the upper stationary cross-member 2 has a central bore 19 through which the motor mounting tubular member 11 passes. The bore 19 leaves sufficient clearance between cross-member 2 and tubular member 11 so that the tubular member 11 can apply the reaction torque moment to the lower force transmitting cross-member 5. FIG. 3 shows that the lower cross-member 5 also has a central bore 19A surrounded by the tubular member 11. The tubular member is secured to the lower cross-member 5 by, for example, screws 11A. The shaft 16 passes freely through the bore 19A as best seen in FIG. 3.

Referring to FIGS. 2 and 3, two force sensing elements, such as load cells 4A and 4B are operatively arranged inside the torque joint 3 between the members 2 and 5 as will now be described. Preferably, bending beams are used as the load cells 4A and 4B. The upper end of the bending beam 4A is secured by screws 4A1 to a downwardly extending stud 2A of the upper member 2. Similarly, the bending beam 4B is connected with its upper end through screws 4B1 to a downwardly extending stud 2B of the upper member 2. The lower end 4A2 of the bending beam 4A has secured thereto a force transmitting pin 4A3 adjustably held in place by two nuts 4A4. A contact tip 4A5 of the force transmitting pin 4A3 bears against a stop member 14B rigidly secured to the lower cross-member 5. The force transmitting pin 4A3 is threaded and passes through a threaded hole in the lower end 4A2 of the bending beam 4A. When the nuts 4A4 are loosened, the horizontal position of the pin 4A3 may be adjusted whereupon the nuts 4A4 are tightened again. The second bending beam 4B is mounted in the same manner and its lower end 4B2 carries a force transmitting pin 4B3 also adjustable by nuts 4B4 as described. The contact tip 4B5 of the pin 4B3 bears against a stop member 14A also rigidly secured to the lower cross-member 5. When the shaft 16 rotates counterclockwise as shown in FIG. 3 by the arrow 20, the contact of the tips 4A5 and 4B5 against the stop members 14B and 14A respectively, causes the bending beams 4A and 4B to bend in response to the clockwise reaction torque moment indicated by the arrow 20A opposing the drive torque 20.

As above mentioned, force sensors or the bending beams 4A and 4B, as best seen in FIG. 3, are arranged mirror-symmetrically relative to the central axis 16A of the apparatus and parallel to each other.

Referring further to FIGS. 2 and 3, the above mentioned springs 12A, 12B, and 12C are secured by screws 21 at their upper and lower ends to the respective upper and lower cross-members 2 and 5. Thus, the plane of each of these leaf springs 12A, 12B, and 12C extends substantially radially relative to the central axis 16A of the apparatus and members 2, 5 substantially to form a cage with the springs.

FIG. 3 further shows that both of the cross-members 2 and 5 form ring plates or disks and both of these disks are of the same construction. However, the tubular member 11 is not shown in FIG. 2 to simplify the illustration. As best seen in FIG. 3, each of the ring disks comprises three cut-outs 18, each cut-out having a radial edge 17 and a chord edge 18A, wherein the radial edges 17 are circumferentially spaced from one another by an angle of 120°. Due to the arrangement of the leaf springs 12A, 12B, 12C so that the plane of their spring leaves extends radially, these springs are soft against bending in the circumferential direction and stiff in the axial direction.

FIGS. 2 and 3 also illustrate the above mentioned symmetry of the two bending beams 4A and 4B relative to each other and relative to the central axis, whereby these bending beams are spaced from each other by 180°. If more than two bending beams are used for sensing the reaction torque moments, four beams, e.g., would be spaced by 90° and also symmetrically arranged relative to the central axis. Where three bending beams are used, they would also be symmetrically arranged and symmetrically spaced by 120° from one another.

Instead of using three springs 12A, 12B, and 12C as shown, two or more such springs could be used, where again a symmetric arrangement is preferred.

Referring to FIG. 3, the drive shaft 16 is shown in its central stationary position so that its central rotational axis 7 coincides with the central longitudinal axis 16A of the apparatus. However, FIG. 3 also shows by dashed lines a slightly off-center position 16'. When the shaft 16 is in the central position, the two bending beams are equally spaced from the center by lever arms L1 and L2 and from each other by a constant spacing L. However, in practice, it may occur that the drive shaft 16 assumes a somewhat off-center position 16', for example, due to a nonuniform loading with bulk material M, whereby there is a deviation X between the central rotational axis 7 and the apparatus central axis 16A. As a result, the lever arm L1' becomes somewhat longer by the spacing X and the lever arm L2' becomes correspondingly shorter. However, it is an advantage of the invention that this change in the length of the lever arms does not affect the measuring results because the sum of the lines arm length and thus the spacing L remains constant, whereby there is an automatic compensation for such changes.

The apparatus according to the invention operates as follows. The motor 1 drives the shaft 16 and thus the winged wheel 8 at a constant r.p.m., whereby centrifugal forces drive the centrally applied flow of granular material M radially outwardly as indicated at F in FIG. 1. The radially outward flow F produces a so-called Coriolis force directed perpendicularly to the angular velocity of the material particles. It is known according to physical laws that the Coriolis force is proportional to the mass through-flow through the winged wheel 8, whereby a brake or reaction torque moment is applied to the motor 1. Since, as described above, the housing 1A of the motor is only rigidly connected to the lower cross-member 5 of the torsion joint 3, the reaction torque moment is applied-to the torsion joint and not directly to the wheel housing 9A. As a result, the force 20A tends to twist the member 5. Since the spring elements 12A, 12B, and 12C are soft against bending in the rotational direction 20, the force 20A will bend the bending beams 4A and 4B, whereby the bending beams produce a signal which is proportional to the force 20A and thus proportional to the mass through-flow through the apparatus. Applying the mechanical advantage provided by the lever arms L1 and L2, it is possible to calculate the respective moments which provide a direct measure for the through-flow of the material M through the apparatus. This signal remains unaffected by any deviations x of the shaft 16 from its central position as explained above, because the spacing L remains constant regardless how the length L1, L2 changes. This inherent compensation of any drive shaft position variations is an important advantage of the invention.

Although the invention has been described with reference to specific example embodiments, it will be appreciated that it is intended to cover all modifications and equivalents within the scope of the appended claims.

What I claim is:

1. An apparatus for measuring a bulk material mass flow by measuring Coriolis forces, comprising a wheel housing (9A, 15), a winged wheel (8) in said wheel housing for diverting an incoming mass flow in a radial direction relative to a rotational axis (7) of said winged wheel (8), a drive motor (1) having a motor housing (1A) and a drive shaft (16) for driving said winged wheel, a torsion joint (3) for supporting said motor housing on said wheel housing and for driving said winged wheel (8) through said drive shaft (16), means for measuring a reaction torque moment when said motor drive shaft drives said winged wheel (8), said torsion joint (3) comprising a stationary member (2), first means (6) for mounting said stationary member (2) to said wheel housing, a force introduction member (5), spring means (12A, 12B, 12C) mounting said force introduction member (5) to said stationary member (2) for introducing said reaction torque moment from said motor housing to said reaction torque moment measuring means when said drive shaft (16) drives said winged wheel (8), and second means (1B, 11) for securing said motor housing (1A) to said force introduction member (5), said spring means (12A, 12B, 12C) being stiff in a longitudinal axial direction and flexible in a rotational direction (20), whereby said force introduction member (5) can yield in said rotational direction (20) relative to said stationary member (2) to an extent permitted by said spring means, said reaction torque moment measuring means comprising at least two load cells (4A, 4B) operatively interposed between said stationary member (2) and said force introduction member (5) for measuring said torque reaction moment and to provide a respective torque signal, said at least two load cells being arranged symmetrically on opposite sides relative to a central apparatus axis (16A).

2. The apparatus of claim 1, wherein said torsion joint (3) is arranged to coaxially surround said drive shaft (16), said torsion joint further comprising stop means (14) for transmitting said torque reaction moment between said motor housing of said drive motor (1) and said two load cells for applying a force to said load cells (4A, 4B).

3. The apparatus of claim 1, wherein said first means (6) for mounting said stationary member (2) to said wheel housing (9A, 15) comprises a sleeve (6) rigidly connecting said stationary member (2) to said wheel housing (9A, 15), and wherein said second means (1B, 11) comprise a tubular member (11) for operatively mounting said motor housing on said force introduction member (5), whereby said drive shaft (16) of said drive motor (1) extends coaxially through said tubular member (11), and said motor housing (1) rests vertically on said force introduction member (5).

4. The apparatus of claim 1, wherein said stationary member (2) comprises a first horizontally arranged ring element, wherein said force introduction member (5) comprises a second horizontally arranged ring element, wherein said spring means comprise at least two leaf springs interconnecting said first and second ring elements in such a manner that said torsion joint (3) is flexible to a bending load in said rotational direction (20) and so that said torsion joint (3) is stiff against bending loads effective in a vertical, axial direction.

5. The apparatus of claim 4, wherein said at least two load cells (4A, 4B) are arranged between said first and second ring elements said apparatus further comprising means (4A1, 4B1) for rigidly connecting one end of said load cells to said first stationary ring elements (2), and means (4A2, 4B2) for operatively coupling the other end of said load cells (4A, 4B) to said second ring element (5) for applying a force representing said reaction torque moment to said load cells.

6. The apparatus of claim 1, wherein each of said at least two load cells has a force introduction point so that there are at least two force introduction points which are so arranged that there is a uniform circumferential spacing between said at least two force introduction points, and so that a radial spacing of each force introduction point from said rotational axis (7) is the same for both force introduction points.

7. The apparatus of claim 1, wherein said spring means comprise at least two leaf springs which are arranged with a rotational symmetry relative to said rotational axis (7).

8. The apparatus of claim 4, wherein each of said ring elements comprises three cut-outs (18), each cut-out (18) having a radial edge (17) and a chord edge (18A), said spring means comprising three leaf springs and means (21) for rigidly connecting one end of each leaf spring to a respective radial edge (17) of said first stationary ring element (2) and for rigidly connecting an opposite end of each lea spring to a respective radial edge (17) of said second force introduction ring element (5).

9. The apparatus of claim 8, wherein said three leaf springs are spaced circumferentially by 120° and said radial edges are spaced circumferentially by 120°

10. The apparatus of claim 1, wherein said load cells (4A, 4B) are bending beams, one end of which is rigidly coupled to said stationary member (2) and the opposite end of which is operatively engageable by said force introduction member (5).

* * * * *

UNITED STATES PATENT AND TRADEMARK OFFICE
CERTIFICATE OF CORRECTION

PATENT NO. : 5,353,647
DATED : October 11, 1994
INVENTOR(S) : Ludger Toerner

It is certified that error appears in the above-indentified patent and that said Letters Patent is hereby corrected as shown below:

```
Column 1, line 48, replace "Lever" by --lever--;
Column 5, line 50, replace "lines" by --lever--;
Column 5, line 51, replace "length" by --lengths--;
Column 7, line 7,  delete "(1)";
Column 8, line 18, replace "lea" by --leaf--;
Column 8, line 23, after "120°" insert --.--.
```

Signed and Sealed this

Twentieth Day of December, 1994

Attest:

BRUCE LEHMAN

Attesting Officer     Commissioner of Patents and Trademarks